United States Patent
Lin

(10) Patent No.: US 12,363,509 B2
(45) Date of Patent: Jul. 15, 2025

(54) DEVICE AND METHOD FOR HANDLING A RECEPTION OF A MULTICAST BROADCAST SERVICE TRANSMISSION AND A SMALL DATA TRANSMISSION

(71) Applicant: ACER INCORPORATED, New Taipei (TW)

(72) Inventor: Jung-Mao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 433 days.

(21) Appl. No.: 18/071,637

(22) Filed: Nov. 30, 2022

(65) Prior Publication Data

US 2023/0188947 A1  Jun. 15, 2023

Related U.S. Application Data

(60) Provisional application No. 63/287,540, filed on Dec. 9, 2021.

(51) Int. Cl.
*H04W 4/06* (2009.01)
*H04W 76/20* (2018.01)

(52) U.S. Cl.
CPC ............. *H04W 4/06* (2013.01); *H04W 76/20* (2018.02)

(58) Field of Classification Search
CPC ....... H04W 4/06; H04W 76/20; H04W 76/40; H04W 76/27; H04W 72/1268; H04W 72/231; H04W 72/30; H04W 72/566
See application file for complete search history.

(56) References Cited

U.S. PATENT DOCUMENTS

| 2015/0327301 A1 | 11/2015 | Fong |
| 2021/0337625 A1 | 10/2021 | Tsai |
| 2022/0304046 A1* | 9/2022 | Lin ................. H04L 5/0094 |

(Continued)

FOREIGN PATENT DOCUMENTS

| JP | 2015-515814 A | 5/2015 |
| WO | 2021/126924 A1 | 6/2021 |

(Continued)

OTHER PUBLICATIONS

3GPP, 3GPP TR 23.757 V17.0.0; Technical Specification Group Services and System Aspects; Study on architectural enhancements for 5G multicast-broadcast services (Release 17) Mar. 2021, 3GPP, https://www.3gpp.org/ftp/Specs/archive/23_series/23.757/23757-h00.zip, pp. 1-297, Mar. 2021.

(Continued)

*Primary Examiner* — Afshawn M Towfighi
(74) *Attorney, Agent, or Firm* — Winston Hsu

(57) ABSTRACT

A communication device for handling a reception of a multicast broadcast service (MBS) transmission and a small data transmission (SDT) includes: triggering the SDT with a network, when at least one triggering condition is satisfied, wherein the at least one triggering condition comprises that the communication device is not receiving first downlink (DL) data associated with the MBS transmission; transmitting uplink (UL) data associated with the SDT to the network or receiving second DL data associated with the SDT from the network; and receiving a radio resource control (RRC) message from the network to terminate the SDT.

26 Claims, 10 Drawing Sheets

(56) References Cited

U.S. PATENT DOCUMENTS

2024/0049182 A1\* 2/2024 Zhou .................. H04W 72/232
2024/0292328 A1\* 8/2024 Chen ...................... H04W 4/06

FOREIGN PATENT DOCUMENTS

WO      2021/163394 A1    8/2021
WO      2021/231578 A1    11/2021

OTHER PUBLICATIONS

Huawei, HiSilicon, 3GPP TSG-RAN WG2 #116-e R2-2110595 E-meeting, Nov. 1-12, 2021, 3GPP "Control Plane Common aspects for SDT" https://www.3gpp.org/ftp/tsg_ran/wg2_rl2/TSGR2_116-e/Docs/R2-2110595.zip, pp. 1-15, Nov. 1, 2021.
3GPP TSG RAN WG1 #106bis-e; R1-2109771; e-Meeting, Oct. 11-19, 2021; 5.2; SONY; Remaining issues of physical layer aspects for SDT, Oct. 11, 2021.
SONY, Considerations on MBS functions for RRC_IDLE UEs, 3GPP TSG RAN WG1 Meeting #104-e R1-2100873, e-Meeting, Jan. 25-Feb. 5, 2021, p. 1-5, XP051971225, Jan. 19, 2021.
Lenovo et al., SDT Related Procedures, 3GPP TSG-RAN WG3 Meeting #114-e, R3-215319, E-meeting, Nov. 1-11, 2021 ,2021.

\* cited by examiner

DEVICE AND METHOD FOR HANDLING A RECEPTION OF A MULTICAST BROADCAST SERVICE TRANSMISSION AND A SMALL DATA TRANSMISSION

CROSS REFERENCE TO RELATED APPLICATIONS

This application claims the benefit of U.S. Provisional Application No. 63/287,540, filed on Dec. 9, 2021. The content of the application is incorporated herein by reference.

BACKGROUND OF THE INVENTION

1. Field of the Invention

The present invention relates to a device and a method used in a wireless communication system, and more particularly, to a device and a method of handling a reception of a multicast broadcast service (MBS) transmission and a small data transmission (SDT).

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

A user equipment (UE) may receive data associated with a multicast broadcast service (MBS) transmission and a small data transmission (SDT) in a slot according to a UE capability (e.g., parallel reception capability (PRC)) via frequency division multiplexing (FDM) or time division multiplexing (TDM). However, in the case that the UE does not support the UE capability, the UE is not able to receive the data associated with the MBS transmission and the SDT, when the MBS transmission and the SDT overlap. The behavior of the UE will be unpredictable. Thus, how to handling a reception of the MBS transmission and the SDT is an important problem to be solved.

SUMMARY OF THE INVENTION

The present invention therefore provides a communication device and method for handling a reception of a multicast broadcast service (MBS) transmission and a small data transmission (SDT) to solve the abovementioned problem.

A communication device for handling a reception of a MBS transmission and a SDT comprises: triggering the SDT with a network, when at least one triggering condition is satisfied, wherein the at least one triggering condition comprises that the communication device is not receiving first downlink (DL) data associated with the MBS transmission; transmitting uplink (UL) data associated with the SDT to the network or receiving second DL data associated with the SDT from the network; and receiving a radio resource control (RRC) message from the network to terminate the SDT.

A communication device for handling a reception of a MBS transmission and a SDT comprises: triggering the SDT with a first network, when at least one triggering condition is satisfied; ignoring first downlink (DL) data associated with a first one of the MBS transmission and the SDT from the first network, and receiving second DL data associated with a second one of the MBS transmission and the SDT from the first network; and receiving a radio resource control (RRC) message from the first network to terminate the SDT.

A communication device for handling a reception of a MBS transmission and a SDT comprises: triggering the SDT with a network, when at least one triggering condition is satisfied; receiving at least one first downlink (DL) data associated with the at least one MBS transmission from the network according to assistance information; and receiving a radio resource control (RRC) message from the network to terminate the SDT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
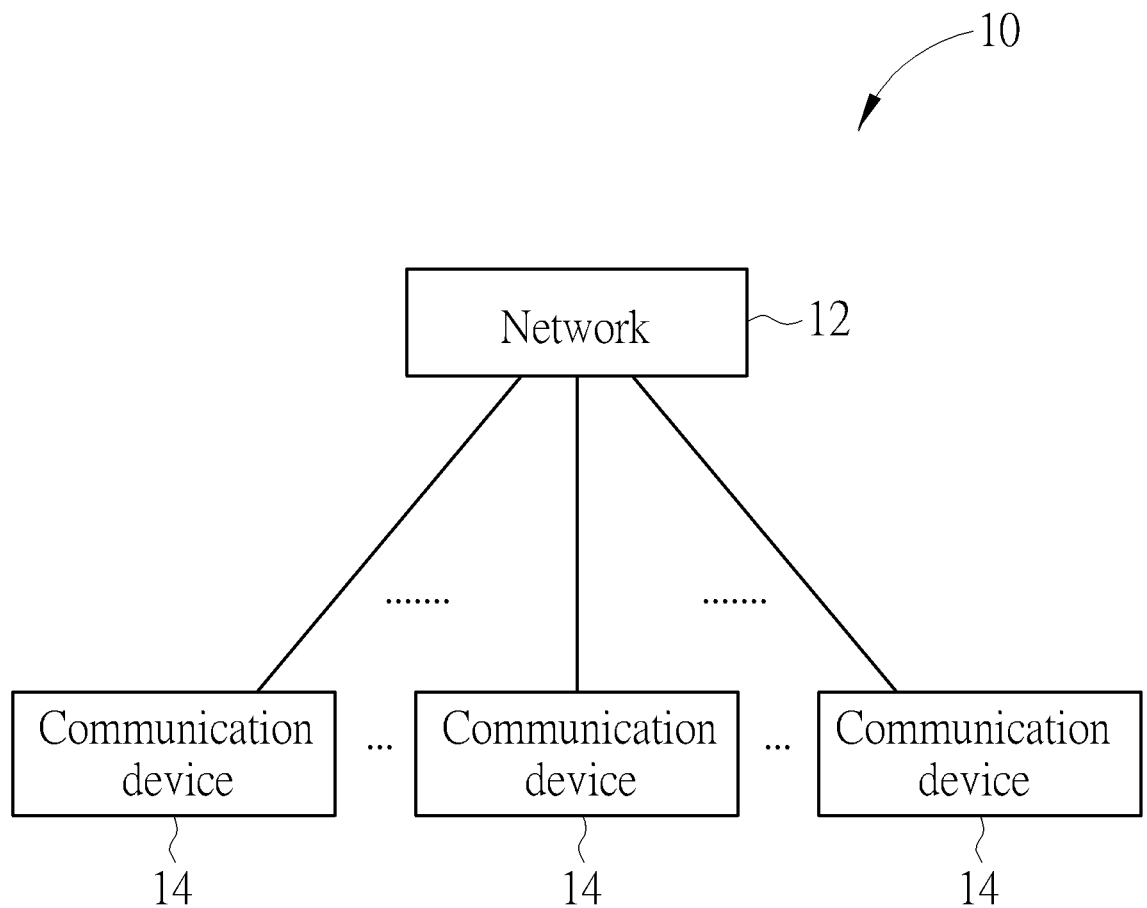
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell (s)) and/or unlicensed carrier (s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LIE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the gNB or the 5G BS of network 12 may include a NTN Gateway and a NTN payload. In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), Access and Mobility Management Function (AMF), Session Management Function (SMF), User Plane Function (UPF), Authentication Server Function (AUSF), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device 14 may be a user equipment (UE), a Very Small Aperture Terminal (VSAT), a low cost device (e.g., machine type communication (MTC) device), a device-to-device (D2D) communication device, a narrowband internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
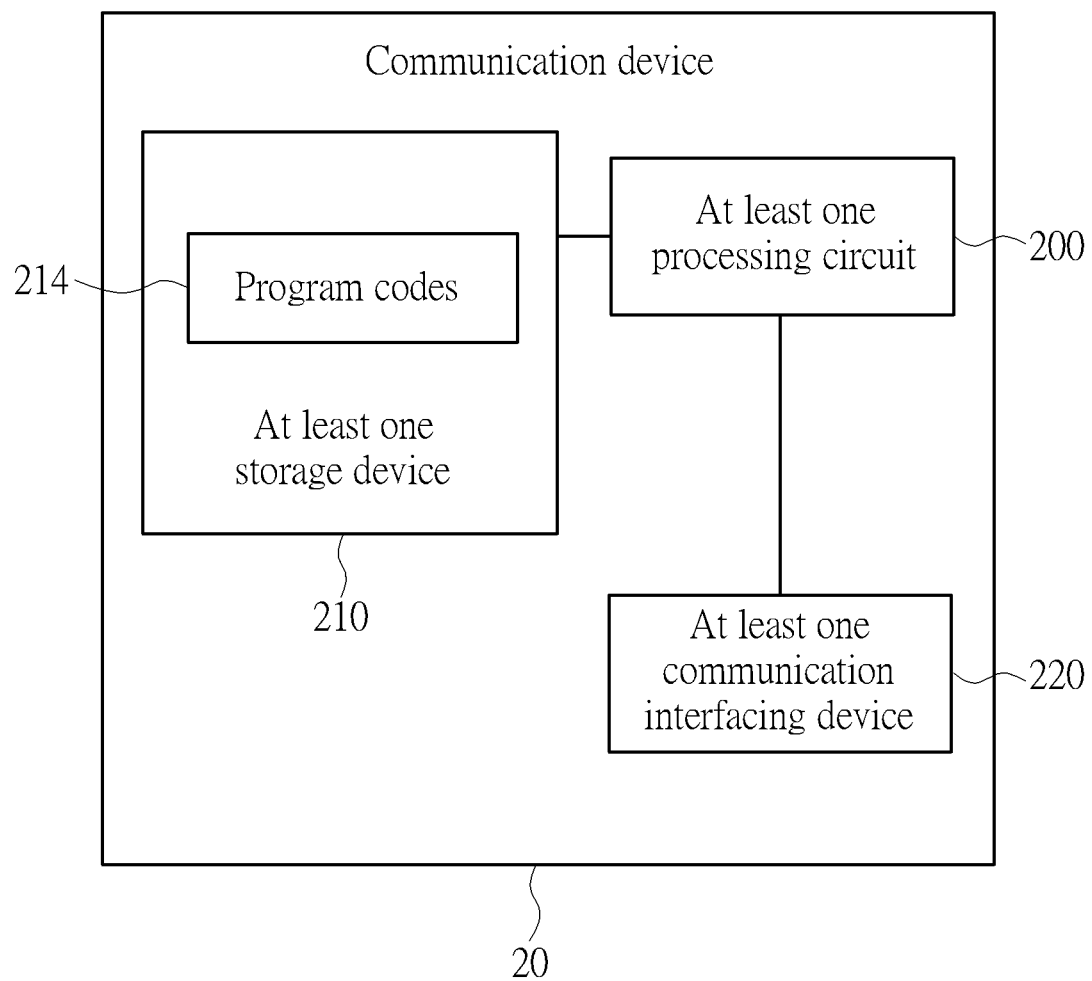
FIG. 2 is a schematic diagram of a communication device according to an example of the present invention.

FIG. 2 is a schematic diagram of a communication device 20 according to an example of the present invention. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
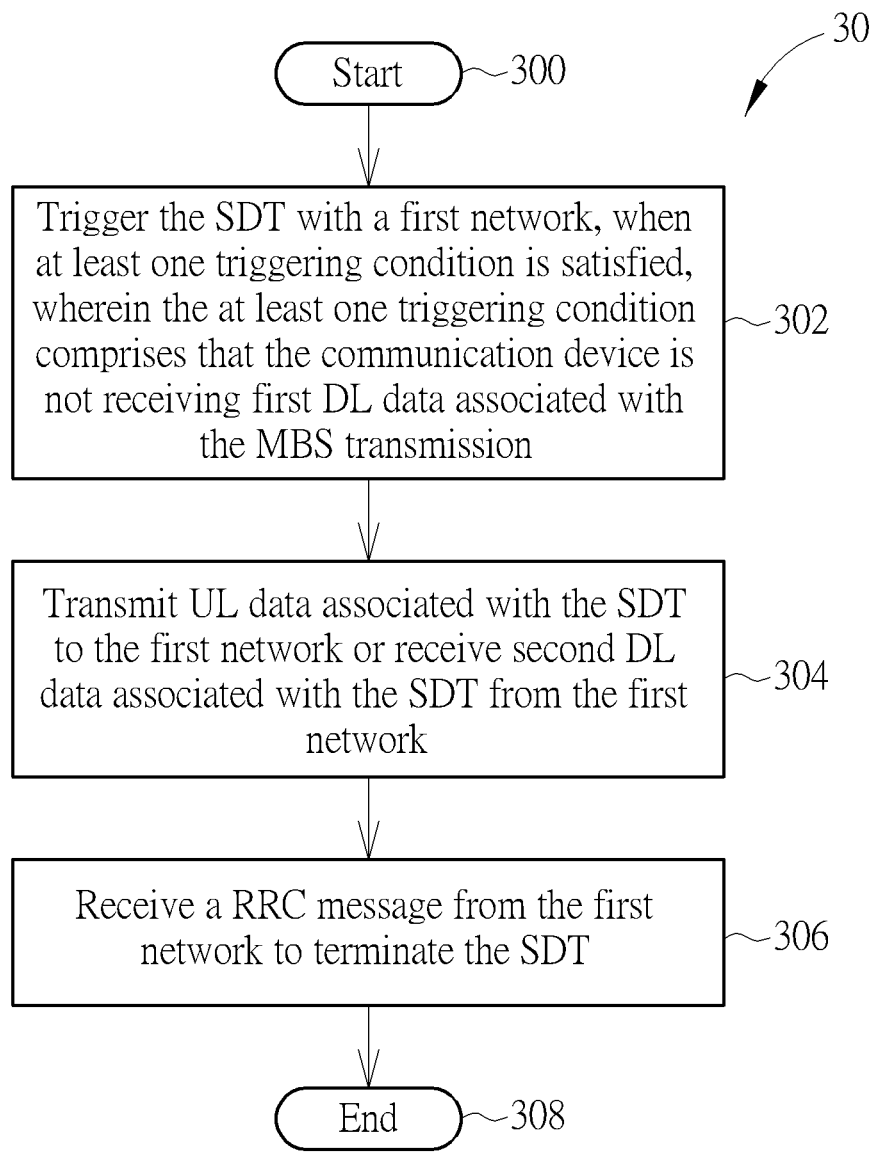
FIG. 3 is a flowchart of a process according to an example of the present invention.

FIG. 3 is a flowchart of a process 30 according to an example of the present invention. The process 30 may be utilized in a communication device (e.g., the communication device 20 in FIG. 2), to handle a reception of a multicast broadcast service (MBS) transmission and a small data transmission (SDT). The process 30 may be compiled into the program codes 214 and includes the following steps:

Step 300: Start.

Step 302: Trigger the SDT with a first network, when at least one triggering condition is satisfied, wherein the at least one triggering condition comprises that the communication device is not receiving first DL data associated with the MBS transmission.

Step 304: Transmit UL data associated with the SDT to the first network or receive second DL data associated with the SDT from the first network.

Step 306: Receive a radio resource control (RRC) message from the first network to terminate the SDT.

Step 308: End.

According to the process 30, the communication device enters an inactive mode, camps on a first network, and triggers the SDT with the first network when at least one triggering condition is satisfied. The at least one triggering condition comprises that the communication device is not receiving first DL data associated with the MBS transmission. Then, the communication device transmits UL data associated with the SDT to the first network, and/or receives second DL data associated with the SDT from the first network. The communication device receives a RRC message from the first network to terminate the SDT. The communication device terminates the SDT in response to the RRC message. That is, the communication device is not able to trigger/perform the SDT when the MBS transmission is performed, and triggers/performs the SDT when the MBS transmission is not performed. In addition, the communication device is not able to perform the MBS transmission during the SDT. Thus, the problem of how to handling the reception of the MBS transmission and the SDT can be solved.

Realization of the process 30 is not limited to the above description. The following examples may be applied to realize the process 30.

In one example, the communication device does not trigger the SDT during a time offset (e.g., a guard time (GA)) before the reception of the first DL data associated with the MBS transmission. That is, the at least one triggering condition further comprises that a time instant of triggering the SDT is not during the time offset before a time duration for receiving the first DL data. In one example, the time offset is not smaller than a first threshold. The first threshold is configured by the first network. In one example, the communication device transmits an indicator to the first network, after triggering the SDT with the first network. The indicator indicates that the SDT is during a time offset (e.g., a GA) before the reception of the first DL data associated with the MBS transmission. That is, the communication device informs the first network that the MBS transmission is about to be performed by transmitting the indicator. In one example, the communication device receives second DL data associated with the UL data (or associated with the SDT) from the first network.

In one example, the communication device configures a first priority of the MBS transmission and a second priority of the SDT (e.g., the second priority is higher than the first priority). That is, the communication device determines to perform the MBS transmission or the SDT (e.g., to receive the first DL data or the second DL data) by itself. In one example, the communication device ignores (e.g., passes) a first identifier associated with the MBS transmission according to the first priority and the second priority, and receives (e.g., monitors) a second identifier associated with the SDT according to the first priority and the second priority. The first identifier indicates a first resource (e.g., a physical DL shared channel (PDSCH)) for the communication device to receive the first DL data associated with the MBS transmission. The second identifier indicates a second resource (e.g., a PDSCH) for the communication device to receive the second DL data associated with the SDT. That is, the communication device ignores the first DL data associated with the MBS transmission by ignoring the first identifier, and receives the second DL data associated with the SDT by receiving the second identifier. In one example, the first identifier and the second identifier are comprised in a same physical DL control channel (PDCCH), or are comprised in different PDCCHs. In one example, the first identifier is a group-radio network temporary identifier (G-RNTI), and the second identifier is a cell-RNTI (C-RNTI).

In one example, the communication device receives (e.g., monitors) a first identifier associated with the MBS transmission and a second identifier associated with the SDT. Then, the communication device ignores (e.g., passes) a first resource (e.g., a PDSCH) indicated by the first identifier and receives a second resource (e.g., a PDSCH) indicated by the second identifier according to the first priority and the second priority, when the first resource and the second resource overlap (e.g., collide). The first resource indicated by the first identifier is for the communication device to receive the first DL data associated with the MBS transmission. The second resource indicated by the second identifier is for the communication device to receive the second DL data associated with the SDT. That is, the communication device ignores the first DL data associated with the MBS transmission by ignoring the first resource, and receives the second DL data associated with the SDT by receiving the second resource.

In one example, the at least one triggering condition further comprises that: the communication device supports the SDT, and has a valid configuration of the SDT. In one example, the at least one triggering condition further comprises at least one following condition: the UL data belongs to a data radio bearer (DRB) of the SDT; and a volume of the UL data is smaller than a second threshold. In one example, the communication device starts a timer for detecting a failure of the SDT, after triggering the SDT with the first network. In one example, the communication device stops the timer, after receiving the RRC message from the first network to terminate the SDT.

In one example, the communication device does not support a parallel reception capability (PRC). The PRC is a capability of receiving a plurality of PDSCHs (e.g., unicast PDSCH and group-common PDSCH) in a slot. That is, the communication device is not able to receive DL data (e.g., the first DL data and the second DL data) associated with the SDT and the MBS transmission simultaneously, if the communication device does not support the PRC. In one example, the first network transmits a UE context request message to a second network, and receives a UE context response message from the second network. The first network knows whether the communication device supports the PRC according to the UE context response message. In one example, the first network comprises (e.g., is) a serving gNB of the communication device or a serving cell of the communication device. In one example, the second network comprises (e.g., is) a last serving gNB of the communication device or a last serving cell of the communication device.

Figure 4:
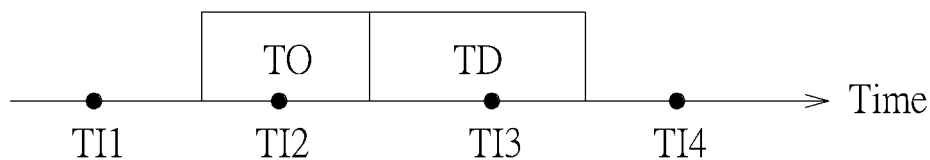
FIG. 4 is a schematic diagram of a reception of a MBS transmission and a SDT according to an example of the present invention.

FIG. 4 is a schematic diagram of a reception of a MBS transmission and a SDT according to an example of the present invention, and may be utilized to implement the process 30. In FIG. 4, there are a time duration TD, a time offset TO and time instants TI1-TI4 on a time domain. The time duration TD, the time offset TO and the time instants TI1-TI4 are used for illustrating the example of the present invention, and are not limited herein. The time duration TD is used for the communication device to perform the MBS transmission (e.g., receive the first DL data associated with the MBS transmission). The time offset TO is a GA before the time duration TD. The time instants TI1-TI4 are possible time instants for the communication device to trigger the SDT, and are shown as dots. The communication device is able to trigger the SDT at the time instant TI1, because the time instant TI1 is not during the time duration TD and the time offset TO. The communication device is not able to trigger the SDT at the time instant TI2 because the time instant TI2 is during the time offset TO, if the at least one triggering condition comprises that a time instant of triggering the SDT is not during the time offset TO. The communication device is not able to trigger the SDT at the time instant TI3, because the time instant TI3 is during the time duration TD. The communication device is able to trigger the SDT at the time instant TI4, because the time instant TI4 is not during the time duration TD and the time offset TO. That is, for the communication device, the MBS transmission has a higher priority than the SDT. The communication device does not trigger/perform the SDT, when performing (or being about to perform) the MBS transmission.

Figure 5:
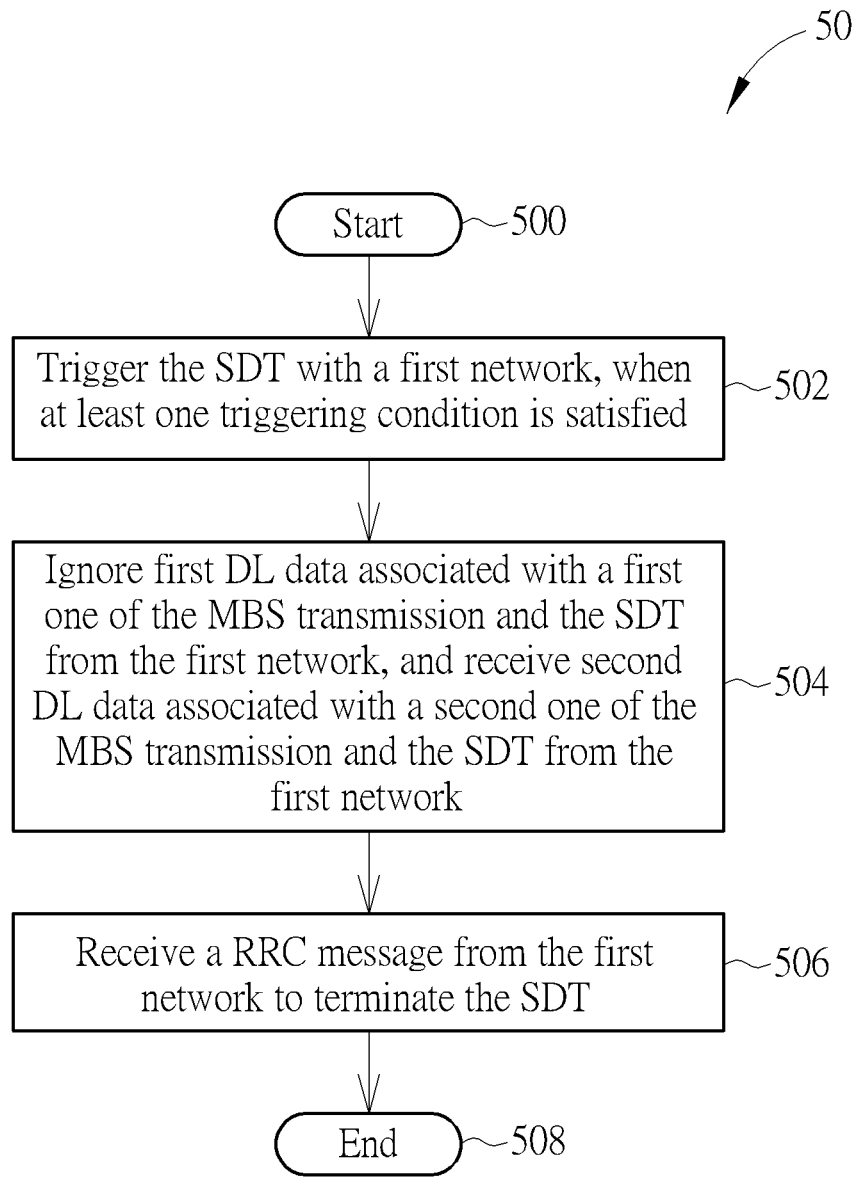
FIG. 5 is a flowchart of a process according to an example of the present invention.

FIG. 5 is a flowchart of a process 50 according to an example of the present invention. The process 50 may be utilized in a communication device (e.g., the communication device 20 in FIG. 2), to handle a reception of a MBS transmission and a SDT. The process 50 may be compiled into the program codes 214 and includes the following steps:

Step 500: Start.

Step 502: Trigger the SDT with a first network, when at least one triggering condition is satisfied.

Step 504: Ignore first DL data associated with a first one of the MBS transmission and the SDT from the first network, and receive second DL data associated with a second one of the MBS transmission and the SDT from the first network.

Step 506: Receive a RRC message from the first network to terminate the SDT.

Step 508: End.

According to the process 50, the communication device enters an inactive mode, camps on a first network, and triggers the SDT with the first network when at least one triggering condition is satisfied. Then, the communication device may transmit UL data associated with the SDT to the first network. The communication device ignores (e.g., passes) first DL data associated with a first one of the MBS transmission and the SDT from the first network, and receives second DL data associated with a second one of the MBS transmission and the SDT from the first network. In one example, the first one of the MBS transmission and the SDT is the MBS transmission, and the second one of the MBS transmission and the SDT is the SDT. In one example, the first one of the MBS transmission and the SDT is the SDT, and the second one of the MBS transmission and the SDT is the MBS transmission. The communication device receives a RRC message from the first network to terminate the SDT. The communication device terminates the SDT in response to the RRC message. That is, a first priority of the first one of the MBS transmission and the SDT is lower than a second priority of the second one of the MBS transmission and the SDT. The communication device performs the second one rather than the first one (e.g., receiving the second DL data rather than the first DL data), when the first one and the second one overlap (e.g., collide). Thus, the problem of how to handling the reception of the MBS transmission and the SDT can be solved.

Realization of the process 50 is not limited to the above description. The following examples may be applied to realize the process 50.

In one example, the communication device ignores (e.g., passes) a first identifier associated with the first one of the MBS transmission and the SDT, and receives (e.g., monitors) a second identifier associated with the second one of the MBS transmission and the SDT. The first identifier indicates a first resource (e.g., a PDSCH) for the communication device to receive the first DL data. The second identifier indicates a second resource (e.g., a PDSCH) for the communication device to receive the second DL data. That is, the communication device ignores the first DL data by ignoring the first identifier, and receives the second DL data by receiving the second identifier. In one example, the first identifier and the second identifier are comprised in a same PDCCH, or are comprised in different PDCCHs. In one example, the first identifier is a G-RNTI associated with the MBS transmission, and the second identifier is a C-RNTI associated with the SDT. In one example, the first identifier is a C-RNTI associated with the SDT, and the second identifier is a G-RNTI associated with the MBS transmission.

In one example, the communication device receives (e.g., monitors) a first identifier associated with the first one of the MBS transmission and the SDT and a second identifier associated with the second one of the MBS transmission and the SDT. Then, the communication device ignores (e.g., passes) a first resource (e.g., a PDSCH) indicated by the first identifier and receives a second resource (e.g., a PDSCH) indicated by the second identifier, when the first resource and the second resource overlap (e.g., collide). The first resource indicated by the first identifier is for the communication device to receive the first DL data. The second resource indicated by the second identifier is for the communication device to receive the second DL data. That is, the communication device ignores the first DL data by ignoring the first resource, and receives the second DL data by receiving the second resource.

In one example, the communication device configures priorities of the MBS transmission and the SDT. In one example, a second network configures the priorities of the MBS transmission and the SDT.

There are various ways for the second network to configure the priorities of the MBS transmission and the SDT. In one example, the communication device receives a release message (or a reconfiguration message) from the second network. The release message (or the reconfiguration message) comprises a configuration configuring the communication device to ignore a first identifier associated with the first one of the MBS transmission and the SDT or a first resource associated with the first one of the MBS transmission and the SDT. The first identifier indicates the first resource, and the first resource is for the communication device to receive the first DL data. That is, the configuration indicates the communication device to ignore the first DL data. Accordingly, the communication device ignores the first DL data according to the configuration. In one example, the communication device transits an indicator to the second network, before receiving the release message (or the reconfiguration message) from the second network. The indicator indicates the first priority of the first one of the MBS transmission and the SDT is lower than the second priority of the second one of the MBS transmission and the SDT, i.e., indicates a preference of the communication device. That is, the communication device informs its preference to the second network, and the second network configures the priorities of the MBS transmission and the SDT according to the preference of the communication device.

In one example, the communication device is configured (e.g., specified) to ignore a first identifier associated with the first one of the MBS transmission and the SDT or a first resource associated with the first one of the MBS transmission and the SDT (e.g., according to a communication standard). The first identifier indicates the first resource, and the first resource is for the communication device to receive the first DL data. That is, the communication device ignores the first DL data by being configured (e.g., specified) to ignore the first identifier or the first resource (e.g., according to the communication standard).

In one example, in the case that the communication device ignores the DL data associated with the SDT, the communication device transmits negative acknowledgement(s) (NACK) corresponding to the DL data associated with the SDT to the first network. The first network determines that the communication device performs the MBS transmission rather than the SDT (e.g., receives the DL data associated with the MBS transmission rather than the DL data associated with the SDT) and buffers the DL data associated with the SDT, when (continuously) receiving the NACK(s) from the communication device. Then, the first network transmits the DL data associated with the SDT, after performing the MBS transmission.

In one example, the at least one triggering condition comprises that: the communication device supports the SDT, and has a valid configuration of the SDT. In one example, the at least one triggering condition further comprises at least one following condition: the UL data belongs to a DRB of the SDT; and a volume of the UL data is smaller than a second threshold. In one example, the communication device receives the first DL data from the first network, after receiving the second DL data from the first network.

In one example, the communication device does not support a PRC. The PRC is a capability of receiving a plurality of PDSCHs (e.g., unicast PDSCH and group-common PDSCH) in a slot. That is, the communication device is not able to receive DL data (e.g., the first DL data and the second DL data) associated with the SDT and the MBS transmission simultaneously, if the communication device does not support the PRC. In one example, the first network transmits a UE context request message to a second network, and receives a UE context response message from the second network. The first network knows whether the communication device supports the PRC according to the UE context response message. In one example, the first network comprises (e.g., is) a serving gNB of the communication device or a serving cell of the communication device. In one example, the second network comprises (e.g., is) a last serving gNB of the communication device or a last serving cell of the communication device.

Figure 6:
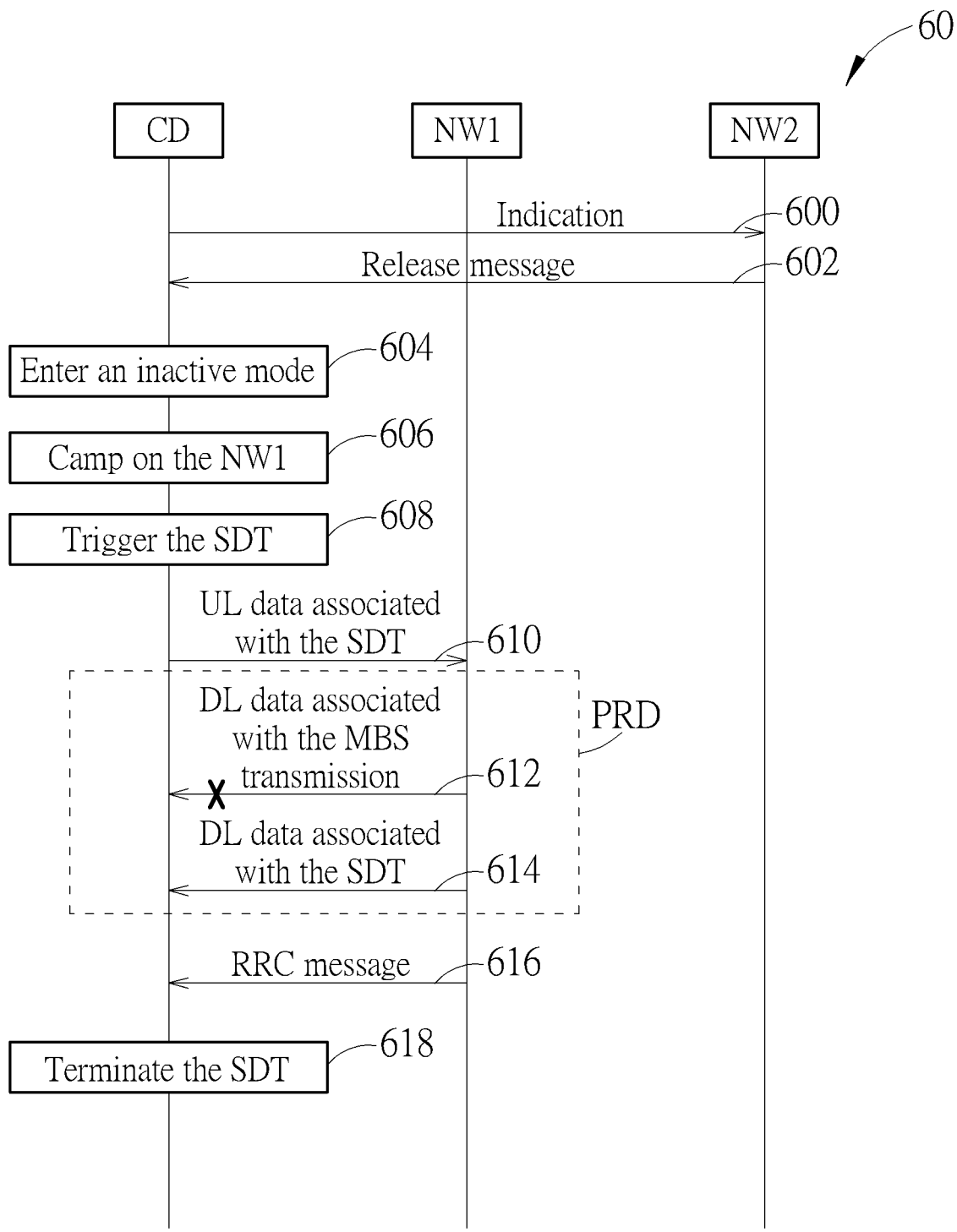
FIG. 6 is a sequence diagram of a process according to an example of the present invention.

FIG. 6 is a sequence diagram of a process 60 according to an example of the present invention. The process 60 is performed by a communication device CD (e.g., the communication device in the process 50), a network NW1 (e.g., the first network in the process 50) and a network NW2 (e.g., the second network in the examples of the process 50). The network NW1 is a serving gNB of the communication device CD, and the network NW2 is a last serving gNB of the communication device CD. In FIG. 6, it is configured that a priority of a MBS transmission is lower than a priority of a SDT. For example, the communication device CD is specified to ignore a G-RNTI associated with the MBS transmission or a resource associated with the MBS transmission when the MBS transmission and the SDT overlap (not shown). For example, the communication device CD may transmit an indication indicating its preference to the network NW2 (Step 600), and the network NW2 transmits a release message to the communication device CD (Step 602). The release message configures the communication device CD to ignore the G-RNTI associated with the MBS transmission or the resource associated with the MBS transmission when the MBS transmission and the SDT overlap.

The communication device CD enters an inactive mode (Step 604) and camps on the network NW1 (Step 606). The communication device CD triggers the SDT (Step 608), when a triggering condition(s) is satisfied. The communication device CD transmits UL data associated with the SDT to the network NW1 (Step 610). During a parallel reception (PR) duration PRD (i.e., when the MBS transmission and the SDT overlap), the communication device CD ignores DL data associated with the MBS transmission (Step 612) and receives DL data associated with the SDT from the network NW1 (Step 614), because the communication device CD is specified/configured to ignore the G-RNTI associated with the MBS transmission or the resource associated with the MBS transmission when the MBS transmission and the SDT overlap. The network NW1 transmits a RRC message to the communication device CD after the PR duration PRD, to terminate the SDT (Step 616). The communication device CD terminates the SDT in response to the RRC message (Step 618). In FIG. 6, Step 612 and 614 may be performed in reverse order.

Figure 7:
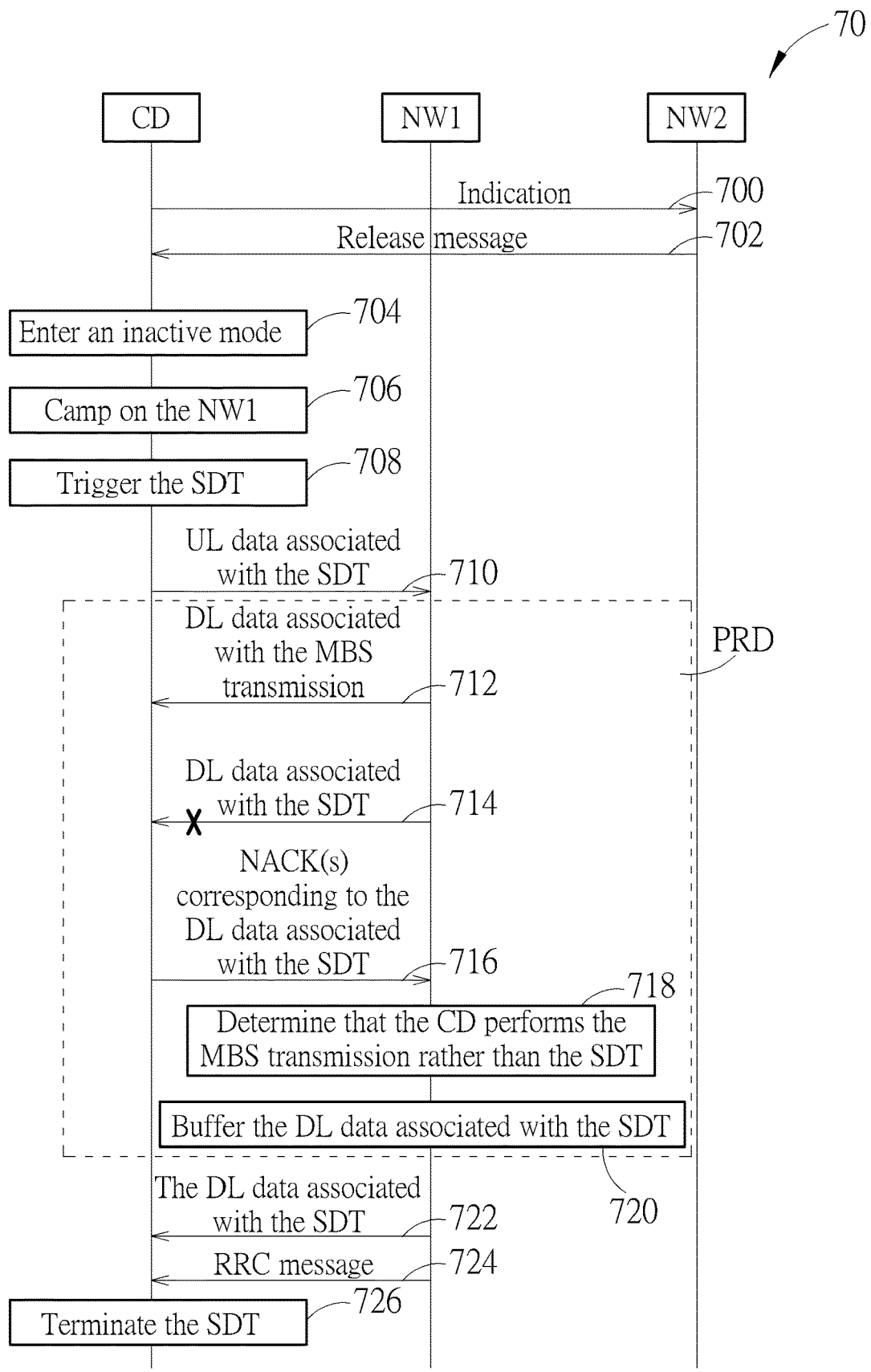
FIG. 7 is a sequence diagram of a process according to an example of the present invention.

FIG. 7 is a sequence diagram of a process 70 according to an example of the present invention. The process 70 is performed by a communication device CD (e.g., the communication device in the process 50), a network NW1 (e.g., the first network in the process 50) and a network NW2 (e.g., the second network in the examples of the process 50). The network NW1 is a serving gNB of the communication device CD, and the network NW2 is a last serving gNB of the communication device CD. In FIG. 7, it is configured that a priority of a SDT is lower than a priority of a MBS transmission. For example, the communication device CD is specified to ignore a C-RNTI associated with the SDT or a resource associated with the SDT when the MBS transmission and the SDT overlap (not shown). For example, the communication device CD may transmit an indication indicating its preference to the network NW2 (Step 700), and the network NW2 transmits a release message to the communication device CD (Step 702). The release message configures the communication device CD to ignore the C-RNTI associated with the SDT or the resource associated with the SDT when the MBS transmission and the SDT overlap.

Steps 704-710 can be referred to Steps 604-610, and are not narrated herein. During a PR duration PRD (i.e., when the MBS transmission and the SDT overlap), the communication device CD receives DL data associated with the MBS transmission from the network NW1 (Step 712), ignores DL data associated with the SDT (Step 714), and transmits NACK(s) corresponding to the DL data associated with the SDT to the network NW1 (Step 716). The network NW1 determines that the communication device CD performs the MBS transmission rather than the SDT (Step 718) and buffers the DL data associated with the SDT (Step 720), when receiving the NACK(s) from the communication device CD. The communication device CD receives DL data associated with the SDT from the network NW1 after the PR duration PRD (Step 722). The network NW1 transmits a RRC message to the communication device CD, to terminate the SDT (Step 724). The communication device CD terminates the SDT in response to the RRC message (Step 726). In FIG. 7, Step 712 and 714 may be performed in reverse order.

Figure 8:
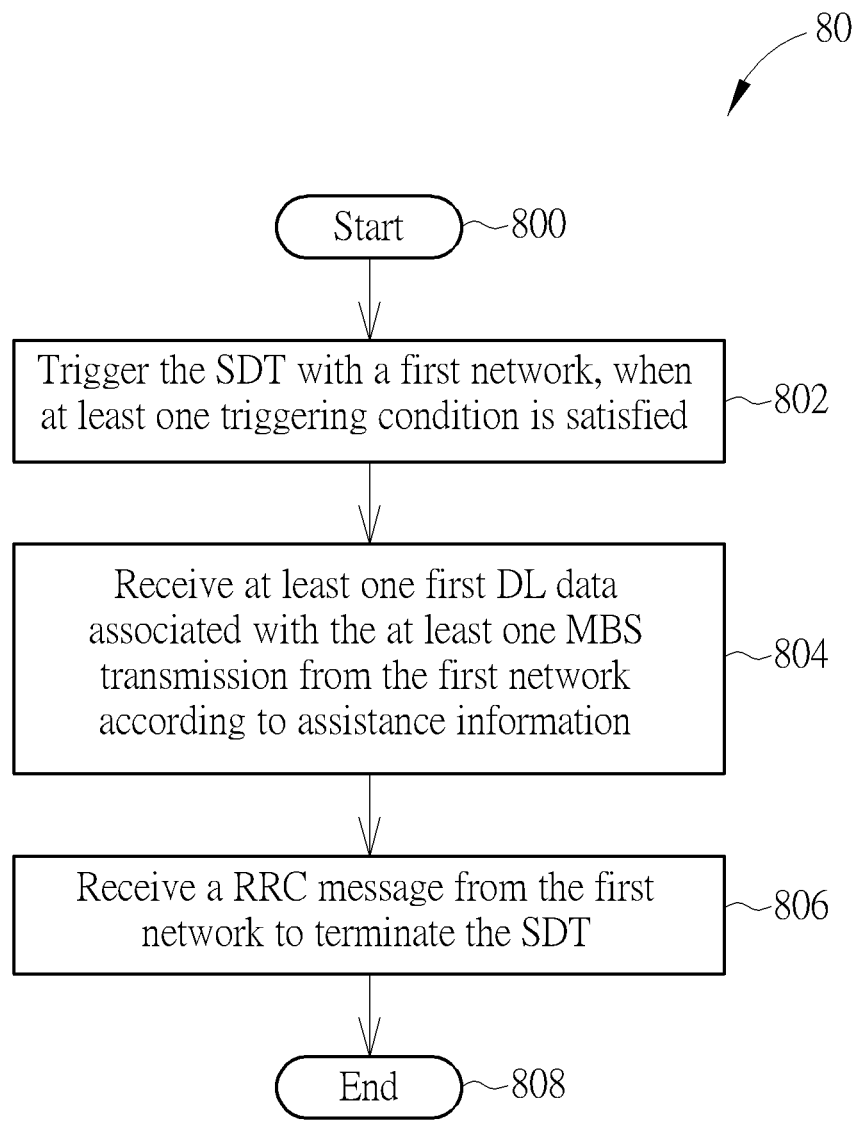
FIG. 8 is a flowchart of a process according to an example of the present invention.

FIG. 8 is a flowchart of a process 80 according to an example of the present invention. The process 80 may be utilized in a communication device (e.g., the communication device 20 in FIG. 2), to handle a reception of a MBS transmission and a SDT. The process 80 may be compiled into the program codes 214 and includes the following steps:

Step 800: Start.

Step 802: Trigger the SDT with a first network, when at least one triggering condition is satisfied.

Step 804: Receive at least one first DL data associated with the at least one MBS transmission from the first network according to assistance information.

Step 806: Receive a RRC message from the first network to terminate the SDT.

Step 808: End.

According to the process 80, the communication device enters an inactive mode, camps on a first network, and triggers the SDT with the first network when at least one triggering condition is satisfied. The communication device may transmit UL data associated with the SDT and assistance information to the first network, and receives at least one first DL data associated with the at least one MBS transmission from the first network according to the assistance information. The communication device may receive second DL data associated with the SDT (or associated with the UL data) from the first network, after receiving the at least one first DL data from the first network according to the assistance information. The communication device receives a RRC message from the first network to terminate the SDT. The communication device terminates the SDT in response to the RRC message. That is, the assistance information configures that the at least one MBS transmission has a higher priority than the SDT. The communication device is not able to perform the SDT (e.g., receive the second DL data associated with the SDT from the first network) when the at least one MBS transmission is performed, and performs the SDT when the at least one MBS transmission is not performed. Thus, the problem of how to handling the reception of the MBS transmission and the SDT can be solved.

Realization of the process 80 is not limited to the above description. The following examples may be applied to realize the process 80.

In one example, the communication device transmits the assistance information, when at least one transmitting condition is satisfied. In one example, the at least one transmitting condition comprises at least one following condition: the communication device does not support a capability of the parallel reception of the at least one MBS transmission and the SDT (e.g., a PRC); a first priority of the at least one MBS transmission is higher than a second priority of the SDT; and the communication device is configured (e.g., is interested) to receive the at least one MBS transmission.

In one example, the assistance information comprises at least one of at least one identity (ID) of the at least one MBS transmission (e.g., MBS session ID), at least one identifier (e.g., G-RNTI) associated with the at least one MBS transmission or a statement of additional information (SAI) associated with the at least one MBS transmission. In one example, the assistance information comprises (e.g., is) an indicator indicating that the first network does not transmit the second DL data associated with the SDT (or associated with the UL data) during the at least one MBS transmission. That is, according to the assistance information, the first network does not perform the SDT (e.g., does not transmit/schedule the second DL data associated with the SDT) and buffers the second DL data associated with the SDT, when the MBS transmission and the SDT overlap.

In one example, the communication device starts a timer for detecting a failure of the SDT, after triggering the SDT with the first network. In one example, the communication device discontinues the timer, when receiving the at least one first DL data from the first network according to the assistance information. In one example, the communication device continues the timer after receiving the at least one first DL data from the first network according to the assistance information. In one example, the communication device stops the timer, after receiving the RRC message from the first network.

In one example, the at least one triggering condition comprises that: the communication device supports the SDT, and has a valid configuration of the SDT. In one example, the at least one triggering condition further comprises at least one following condition: the UL data belongs to a DRB of the SDT; and a volume of the UL data is smaller than a second threshold.

In one example, the communication device does not support a PRC. The PRC is a capability of receiving a plurality of PDSCHs (e.g., unicast PDSCH and group-common PDSCH) in a slot. That is, the communication device is not able to receive DL data (e.g., the at least one first DL data and the second DL data) associated with the SDT and the MBS transmission simultaneously, if the communication device does not support the PRC. In one example, the first network transmits a UE context request message to a second network, and receives a UE context response message from the second network. The first network knows whether the communication device supports the PRC according to the UE context response message. In one example, the first network comprises (e.g., is) a serving gNB of the communication device or a serving cell of the communication device. In one example, the second network comprises (e.g., is) a last serving gNB of the communication device or a last serving cell of the communication device.

Figure 9:
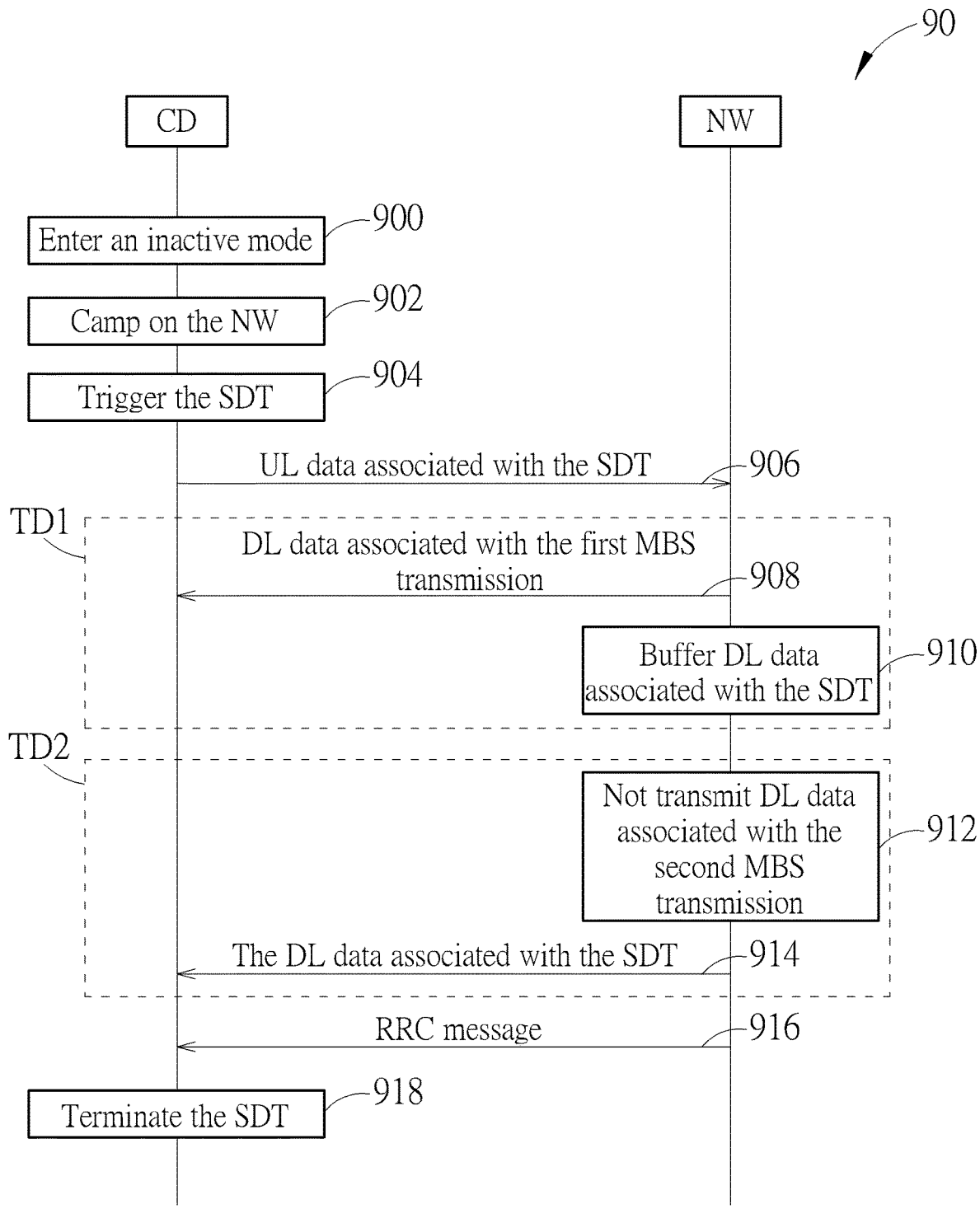
FIG. 9 is a sequence diagram of a process according to an example of the present invention.

FIG. 9 is a sequence diagram of a process 90 according to an example of the present invention. The process 90 is performed by a communication device CD (e.g., the communication device in the process 80) and a network NW (e.g., the first network in the process 80). The network NW is a serving gNB of the communication device CD. In FIG. 9, the network NW configures/schedules to perform a first MBS transmission during a time duration TD1 and perform a second MBS transmission during a time duration TD2. The communication device CD enters an inactive mode (Step 900) and camps on the network NW (Step 902). The communication device CD triggers a SDT (Step 904), when a triggering condition(s) is satisfied. The communication device CD transmits UL data associated with the SDT and assistance information to the network NW (Step 906), when a transmitting condition(s) is satisfied. The assistance information comprises information (e.g., a MBS session ID, a G-RNTI and/or a SAI) of the first MBS transmission.

During the time duration TD1, the network NW transmits DL data associated with the first MBS transmission to the communication device CD (Step 908) and buffers DL data associated with the SDT (Step 910) according to the assistance information. During the time duration TD2, the network NW does not transmit DL data associated with the second MBS transmission to the communication device CD (Step 912) and transmits the DL data associated with the SDT (Step 914). The network NW transmits a RRC message to the communication device CD, to terminate the SDT (Step 916). The communication device CD terminates the SDT in response to the RRC message (Step 918).

In FIG. 9, the assistance information informs the network NW not to transmit/schedule the DL data associated with the SDT overlapping with the first MBS transmissions. That is, priorities of the SDT, the first MBS transmission and the second MBS transmission are determined according to the assistance information: the priority of the first MBS transmission is higher than the priority of the SDT, because the assistance information comprises the information of the first MBS transmission; and the priority of the SDT is higher than the priority of the second MBS transmission, because the assistance information does not comprise information (e.g., a MBS session ID, a G-RNTI and/or a SAI) of the second MBS transmission.

In FIG. 9, Step 908 and 910 maybe performed in reverse order. Step 912 and 914 may be performed in reverse order.

Figure 10:
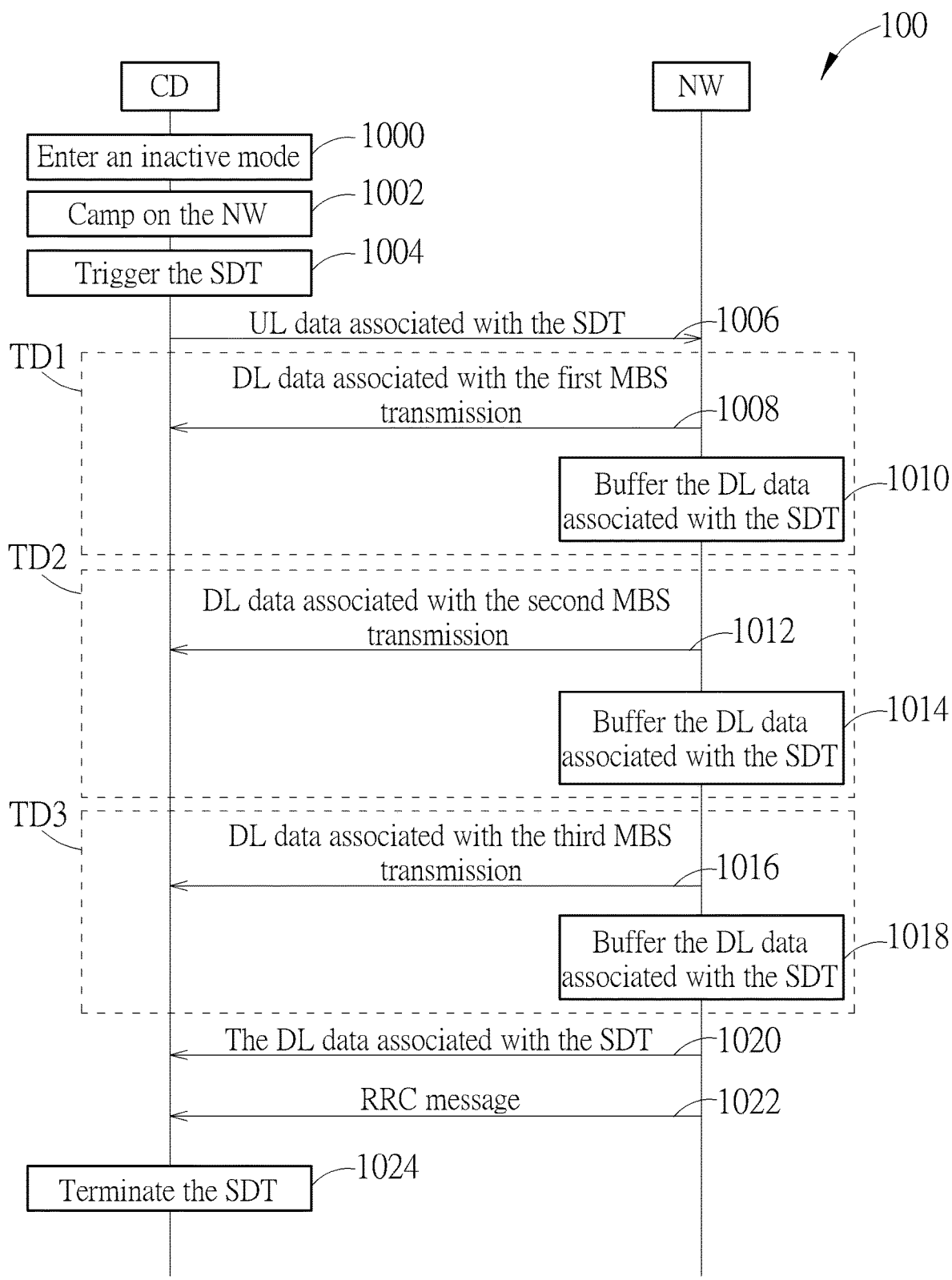
FIG. 10 is a sequence diagram of a process according to an example of the present invention.

FIG. 10 is a sequence diagram of a process 100 according to an example of the present invention. The process 100 is performed by a communication device CD (e.g., the communication device in the process 80) and a network NW (e.g., the first network in the process 80). The network NW is a serving gNB of the communication device CD. In FIG. 10, the network NW configures/schedules to perform a first MBS transmission during a time duration TD1, perform a second MBS transmission during a time duration TD2 and perform a third MBS transmission during a time duration TD3. Steps 1000-1006 can be referred to Steps 900-906, are not narrated herein. The assistance information comprises an indicator indicating that the network NW does not transmit DL data associated with the SDT during the time durations TD1-TD3.

During the time duration TD1, the network NW transmits DL data associated with the first MBS transmission to the communication device CD (Step 1008) and buffers the DL data associated with the SDT (Step 1010) according to the assistance information. During the time duration TD2, the network NW transmits DL data associated with the second MBS transmission to the communication device CD (Step 1012) and buffers the DL data associated with the SDT (Step 1014) according to the assistance information. During the time duration TD3, the network NW transmits DL data associated with the third MBS transmission to the communication device CD (Step 1016) and buffers the DL data associated with the SDT (Step 1018) according to the assistance information. The network NW transmits the DL data associated with the SDT after the time durations TD1-TD3 (Step 1020). The network NW transmits a RRC message to the communication device CD, to terminate the SDT (Step 1022). The communication device CD terminates the SDT in response to the RRC message (Step 1024).

In FIG. 10, the assistance information informs the network NW not to transmit/schedule the DL data associated with the SDT overlapping with any incoming MBS transmissions. That is, priorities of the SDT, the first MBS transmission, the second MBS transmission and the third MBS transmission are determined according to the assistance information: the priority of the first MBS transmission is higher than the priority of the SDT; the priority of the second MBS transmission is higher than the priority of the SDT; and the priority of the third MBS transmission is higher than the priority of the SDT.

In FIG. 10, Step 1008 and 1010 may be performed in reverse order. Step 1012 and 1014 may be performed in reverse order. Step 1016 and 1018 may be performed in reverse order.

Figure 11:
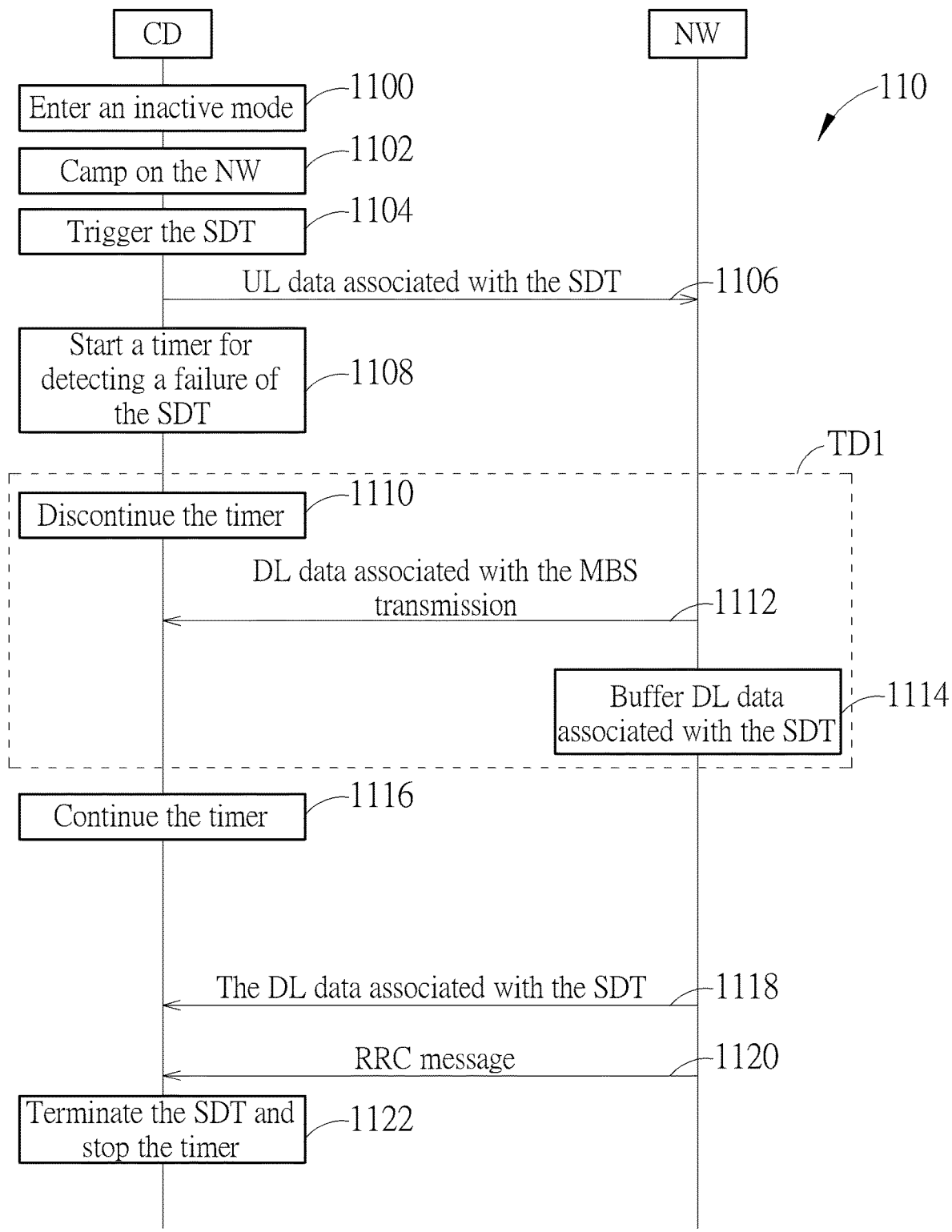
FIG. 11 is a sequence diagram of a process according to an example of the present invention.

FIG. 11 is a sequence diagram of a process 110 according to an example of the present invention. The process 110 is performed by a communication device CD (e.g., the communication device in the process 80) and a network NW (e.g., the first network in the process 80). The network NW is a serving gNB of the communication device CD. In FIG. 11, the network NW configures/schedules to perform a MBS transmission during a time duration TD. Steps 1100-1106 can be referred to Steps 900-906, are not narrated herein. The assistance information comprises information of the MBS transmission, or comprises an indicator indicating that the network NW does not transmit DL data associated with the SDT during the time duration TD. The communication device starts a timer for detecting a failure of the SDT (Step 1108), after transmitting the UL data to the first network.

The communication device CD discontinues the timer at a beginning of the time duration TD (Step 1110). During the time duration TD, the network NW transmits DL data associated with the MBS transmission to the communication device CD (Step 1112) and buffers DL data associated with the SDT (Step 1114) according to the assistance information. The communication device CD continues the timer at an end of the time duration TD (Step 1116). The network NW transmits the DL data associated with the SDT after the time duration TD (Step 1118). The network NW transmits a RRC message to the communication device CD, to terminate the SDT (Step 1120). The communication device CD terminates the SDT and stops the timer in response to the RRC message (Step 1122).

In FIG. 11, the assistance information informs the network NW not to transmit/schedule the DL data associated with the SDT overlapping with the MBS transmission. That is, priorities of the SDT and the MBS transmission are determined according to the assistance information: the priority of the MBS transmission is higher than the priority of the SDT. In addition, the timer is suspended when the MBS transmission is performed. Thus, the network NW still has the DL data associated with the SDT to transmit, before the timer expires. In FIG. 11, Step 1112 and 1114 may be performed in reverse order.

The terms of "first identifier" and "second identifier" described above may be replaced by the terms of "first DL control information (DCI)" and "second DCI", respectively. The operation of "determine" described above may be replaced by the operation of "compute", "calculate", "obtain", "generate", "output", "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above maybe replaced by "on", "in" or "at". The term of "when" described above may be replaced by "upon", "after" and "in response to".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means maybe the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, embodiments of the present invention provide a communication device and method for handling a reception of a MBS transmission and a SDT. The priorities of the MBS transmission and the SDT are determined by the communication device or the network (e.g., according to a triggering condition(s), a release message or assistance information). The communication device receives DL data associated with the MBS transmission or the SDT according to the priorities of the MBS transmission and the SDT, when the MBS transmission and the SDT overlap. Thus, the behavior of the communication device is predictable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a communication device handling a reception of a multicast broadcast service (MBS) transmission and a small data transmission (SDT), comprising:
   triggering the SDT with a network, when at least one triggering condition is satisfied, wherein the at least one triggering condition comprises that the communication device is not receiving first downlink (DL) data associated with the MBS transmission;
   transmitting uplink (UL) data associated with the SDT to the network or receiving second DL data associated with the SDT from the network; and
   receiving a radio resource control (RRC) message from the network to terminate the SDT.

2. The method of claim 1, wherein the communication device does not trigger the SDT during a time offset before the reception of the first DL data associated with the MBS transmission.

3. The method of claim 2, wherein the time offset is not smaller than a threshold.

4. The method of claim 1, wherein the communication device transmits an indicator to the network after triggering the SDT with the network, and the indicator indicates that the SDT is during a time offset before the reception of the first DL data associated with the MBS transmission.

5. The method of claim 1, further comprising:
   configuring a first priority of the MBS transmission and a second priority of the SDT.

6. The method of claim 5, wherein the reception of the second DL data associated with the SDT comprises:
   ignoring a first identifier associated with the MBS transmission according to the first priority and the second priority; and
   receiving a second identifier associated with the SDT according to the first priority and the second priority.

7. The method of claim 5, wherein the reception of the second DL data associated with the SDT comprises:
   receiving a first identifier associated with the MBS transmission and a second identifier associated with the SDT; and
   ignoring a first resource indicated by the first identifier and receiving a second resource indicated by the second identifier according to the first priority and the second priority, when the first resource and the second resource overlap.

8. The method of claim 1, wherein the at least one triggering condition further comprises that:
   the communication device supports the SDT, and has a valid configuration of the SDT.

9. The method of claim 1, further comprising:
   starting a timer for detecting a failure of the SDT, after triggering the SDT with the network; and
   stopping the timer, after receiving the RRC message from the network to terminate the SDT.

10. A method for a communication device handling a reception of a multicast broadcast service (MBS) transmission and a small data transmission (SDT), comprising:
    triggering the SDT with a first network, when at least one triggering condition is satisfied;
    ignoring first downlink (DL) data associated with a first one of the MBS transmission and the SDT from first network, and receiving second DL data associated with a second one of the MBS transmission and the SDT from the first network; and
    receiving a radio resource control (RRC) message from the first network to terminate the SDT.

11. The method of claim 10, further comprising:
    ignoring a first identifier associated with the first one of the MBS transmission and the SDT; and
    receiving a second identifier associated with the second one of the MBS transmission and the SDT.

12. The method of claim 10, further comprising:
    receiving a first identifier associated with the first one of the MBS transmission and the SDT and a second identifier associated with the second one of the MBS transmission and the SDT;
    ignoring a first resource indicated by the first identifier and receiving a second resource indicated by the second identifier, when the first resource and the second resource overlap.

13. The method of claim 10, further comprising:
    receiving a release message from a second network.

14. The method of claim 13, wherein the release message comprises a configuration configuring the communication device to ignore a first identifier associated with the first one of the MBS transmission and the SDT or a first resource associated with the first one of the MBS transmission and the SDT.

15. The method of claim 14, wherein the communication device ignores the first DL data according to the configuration.

16. The method of claim 13, further comprising:
    transmitting an indicator to the second network, before receiving the release message from the second network.

17. The method of claim 16, wherein the indicator indicates that a first priority of the first one of the MBS transmission and the SDT is lower than a second priority of the second one of the MBS transmission and the SDT.

18. The method of claim 10, wherein the communication device is configured to ignore a first identifier associated with the first one of the MBS transmission and the SDT or a first resource associated with the first one of the MBS transmission and the SDT.

19. The method of claim 10, wherein the at least one triggering condition comprises that:
the communication device supports the SDT, and has a valid configuration of the SDT.

20. A method for a communication device handling a reception of at least one multicast broadcast service (MBS) transmission and a small data transmission (SDT), comprising:
triggering the SDT with a network, when at least one triggering condition is satisfied;
receiving at least one first downlink (DL) data associated with the at least one MBS transmission from the network according to assistance information; and
receiving a radio resource control (RRC) message from the network to terminate the SDT.

21. The method of claim 20, wherein the communication device transmits the assistance information, when at least one transmitting condition is satisfied.

22. The method of claim 21, wherein the at least one transmitting condition comprises at least one following condition:
the communication device does not support a capability of the parallel reception of the at least one MBS transmission and the SDT;
a first priority of the at least one MBS transmission is higher than a second priority of the SDT; and
the communication device is configured to receive the at least one MBS transmission.

23. The method of claim 20, wherein the assistance information comprises at least one of at least one identity (ID) of the at least one MBS transmission, at least one identifier associated with the at least one MBS transmission or a statement of additional information (SAI) associated with the at least one MBS transmission.

24. The method of claim 20, wherein the assistance information comprises an indicator indicating that the network does not transmit second DL data associated with the SDT during the at least one MBS transmission.

25. The method of claim 20, further comprising:
starting a timer for detecting a failure of the SDT, after triggering the SDT with the network;
discontinuing the timer, when receiving the at least one first DL data from the network according to the assistance information;
continuing the timer, after receiving the at least one first DL data from the network according to the assistance information; and
stopping the timer, after receiving the RRC message from the network.

26. The method of claim 20, wherein the at least one triggering condition comprises that:
the communication device supports the SDT, and has a valid configuration of the SDT.

* * * * *